United States Patent [19]

Powers et al.

[11] Patent Number: 5,500,795

[45] Date of Patent: Mar. 19, 1996

[54] METHOD AND SYSTEM FOR MONITORING AND CONTROLLING THE PERFORMANCE OF A CALL PROCESSING CENTER

[75] Inventors: Michael C. Powers, Irving; Greg A. Bliss, Colleyville, both of Tex.; Shioupyn Shen, Milpitas, Calif.

[73] Assignee: Teknekron Infoswitch Corporation, Fort Worth, Tex.

[21] Appl. No.: 271,228

[22] Filed: Jul. 6, 1994

Related U.S. Application Data

[63] Continuation of Ser. No. 96,595, Jul. 22, 1993, abandoned, which is a continuation-in-part of Ser. No. 922,210, Jul. 30, 1992, abandoned.

[51] Int. Cl.[6] .................................................. G06F 17/60
[52] U.S. Cl. ................................................ 364/401
[58] Field of Search .............................. 364/401, 402, 364/419.2, 468

[56] References Cited

U.S. PATENT DOCUMENTS

| | | | |
|---|---|---|---|
| 4,476,535 | 10/1984 | Loshing et al. | 364/480 |
| 5,241,621 | 8/1993 | Smart | 395/51 |
| 5,321,621 | 6/1994 | Sainen | 364/470 |

FOREIGN PATENT DOCUMENTS 2221068  1/1990  United Kingdom .

OTHER PUBLICATIONS

Prof. Dr. A. W. Scheer and A. Hars, "From CIM to Enterprise-Wide Data Modelling", ICCIM '91 Proceedings of the International Conference on Computer Integrated Manufacturing, 2–4 Oct., 1991, Singapore, pp. 89–92.

R. L. Katz, "Business/enterprise modeling" IBM Systems Journal, 1990, Armonk, New York vol. 29, No. 4 pp. 509–525.

*Primary Examiner*—Donald E. McElheny, Jr.
*Attorney, Agent, or Firm*—Baker & Botts

[57] ABSTRACT

A method and system for generating performance data relating to the efficiency of an organization and including the steps of describing a plurality of performance variables associated with the organization. The performance variables describe measurable properties of the organization. The invention further maps each of the performance variables to a normalized performance variable mapping that has a neutral value and at least one inflection point of the performance variable within a normalized range of values. Each inflection point describes effects of the normalized performance variable in changing from a positive influence to a negative influence on the organization's efficiency. Then the invention assigns a weighting factor to each of the normalized performance variables to produce a plurality of weighted normalized performance variables. The method and system calculate the efficiency of the organization as a function of the plurality of weighted normalized performance variables. The method and system further include the use and maintenance of instruction tables for identifying interactions among the various performance variables.

21 Claims, 3 Drawing Sheets

METHOD AND SYSTEM FOR MONITORING AND CONTROLLING THE PERFORMANCE OF A CALL PROCESSING CENTER

CROSS-REFERENCE TO RELATED APPLICATIONS

This application is a continuation of application Ser. No. 08/096,595, filed Jul. 22, 1993, entitled METHOD AND SYSTEM FOR MONITORING AND CONTROLLING THE PERFORMANCE OF AN ORGANIZATION by Michael C. Powers, Greg A. Bliss and Shioupyn Shen, now abandoned, which is a continuation-in-part of application Ser. No. 07/922,210, filed on Jul. 30, 1992 by Michael C. Powers and Faizul Huq for A METHOD FOR MONITORING AND CONTROLLING THE PERFORMANCE OF AN ORGANIZATION, abandoned.

TECHNICAL FIELD OF THE INVENTION

The present invention relates to automated process control methods and systems and, more particularly, a method and system for automatically monitoring and controlling the performance of a wide variety of organizations including, for example, a telephone call center.

BACKGROUND OF THE INVENTION

Virtually every organization may be described as a system that converts one or more resources into one or more products or services. For example, a manufacturing organization converts raw materials, the fixed or capital resources of a manufacturing plant, and labor into a physical product. Likewise, a service organization transforms raw materials, labor, office space, and any necessary equipment into services for its customers. Income and expenses are inherent features of both types of organizations. The efficiency of an organization in using these resources is a direct measure of organizational performance.

Typically, organizations use a wide variety of methods to measure their performance. A manufacturing organization, for instance, may consider data such as labor hours per unit of production, total or incremental costs per unit of production, income per unit of production, or defects per unit of production in measuring its performance in these types of organizations. By considering the service provided by a service organization to be its "product," it is feasible to use similar measures to gauge organizational performance in these types of organizations. These measures of performance tend to focus on one or more particular aspects of an organization.

In order to measure and improve overall performance, managers frequently analyze these measurements that together can form voluminous and complex data sets. In most cases, however, the manager must ultimately rely heavily on his or her experience and skill to balance and identify the various aspects of organizational performance. Once this is done, the manager determines which aspects of the organization require improvement and tries to prioritize efforts to achieve these improvements. After modifying the organization as suggested by the foregoing analysis, the manager must compile new data that relate to the performance of the modified organization and compare that data with the previous data to see how beneficial the modifications may have been. The process of collecting and analyzing data may take considerable time. During this time, however, ineffective or counter-productive operations may remain in place. These time delays and managerial inefficiencies often work to the detriment of the organization's overall efficiency.

Consequently, there is a need for a method and system that permit active or real-time assessment of an organization's performance to aid managers or other users in analyzing and improving the organization's efficiency.

There is a need for a method and system to permit a user to quantitatively and realistically assess an organization's efficiency. There is a further need for a method and system to permit a manager to analyze an organization's performance on a variety of levels including between groups of an organization as well as between time periods of the organization's operation.

There is a further need for a method and system of determining the effect that different organizational performance parameters have on one another. The method and system should also inform the user of what variables most strongly affect the organization's performance. To be useful, such a method and system should not require extensive programing or data entry.

SUMMARY OF THE INVENTION

The present invention, accordingly, provides a method and system for monitoring and controlling the performance of an organization that overcomes or reduces disadvantages and limitations associated with prior approaches to organizational performance and efficiency monitoring and control.

One aspect of the invention is a method for automatically generating performance data relating to the efficiency of an organization that includes the steps of first describing numerous performance variables associated with the organization. The performance variables relate to measurable properties of the organization. The next step is to map each of the performance variables to a normalized performance variable having a neutral value and at least one inflection point within a normalized range of values. The inflection point describes the changing effects of the normalized performance variable on the organization's efficiency as the variable changes from a minimum value to a maximum value. Next, the method includes the step of assigning a weighting factor to each of the normalized performance variables to produce weighted normalized performance variables. The weighting factor relates to the importance or perceived importance of each of the normalized performance variables to the efficiency of the organization. The method further includes the step of calculating an efficiency ratio that describes the efficiency of the organization as a function of the weighted normalized performance variables.

According to another aspect of the invention, there is provided a system for monitoring and controlling the efficiency of an organization that includes an algorithm for selecting numerous variables that relate to the organization's performance together with the necessary computational device or computer to execute the algorithm instructions. The algorithm includes instructions that the computer can execute to characterize the efficiency of the organization. The algorithm instructions permit selecting a constant time interval during which to accumulate data that serve as values for performance variables. The algorithm also includes instructions for constructing at least one interaction table that relates the performance variables to one another. Further, the algorithm includes instructions for collecting performance variable data for the most recent time interval and then calculating a defined efficiency rating for the most recent time interval using the collected data.

The system may also include within the algorithm instructions for determining a trend of the organization's efficiency by comparing the calculated efficiency rating with a previously calculated efficiency rating. This previously calculated efficiency rating may be, for example, an efficiency rating that was calculated using data from a group consisting of ideal performance variable values, average performance variable values and changing or variable performance variable values for a previous time interval. Furthermore, an aspect of the algorithm is instructions for determining the relative impact of each performance variable on the organization's efficiency rating for the most recent time interval. The system allows repeating these functions often so that a manager or other user can improve his or her assessment of interactions among the performance variables as well as the accuracy of the calculated efficiency rating.

A technical advantage of the present invention is that it provides current information that a manager may use to actively manipulate performance factors within an organization. This facilitates the manager's ability to enhance the organization's efficiency. This is accomplished by the use of an empirically valid method to account for the various factors that affect the overall performance of the organization. The method and system provide an efficiency rating of the organization's performance and indicate which factors have the greatest impact on the efficiency rating. Advantageously, the method allows the organization's management to measure the performance of the organization frequently and to modify those factors having the greatest impact on the efficiency rating in a timely manner. As a result, the manager can more rapidly and more effectively improve the organization's performance.

Another technical advantage of the present invention is that it allows managers, using their knowledge and experience, to make direct inputs into the process for determining the efficiency rating and, thereby, immediately alter the method's outcome. Advantageously, the ability to make such inputs allows an organization's management to change the definition of "good performance." The method provides information that suggests how to modify the organization to achieve the newly-defined "good performance." This may be accomplished on a variety of levels including, for example, comparing efficiency ratings and performance variables of similar organizations, different groups within an organization, as well as various time periods for a single organization.

Yet another technical advantage of the present invention is that it is suitable for a variety of computer systems as well as a variety of different types of organizations. The method and system detect changes in an organization's monitored performance variables. Given the monitored performance variables, the invention produces a rating of the efficiency of the organization in terms of a single number that describes the organization's performance. Thus, the invention dynamically tracks the interactions of an organization and detects deviations from the typical or anticipated interactions. This permits managers to contrast their understanding or theory of how the organization operates with the actual interactions that occur within the organization.

Yet a further technical advantage of the present invention is that, given a set of monitored performance variables, the invention produces interaction tables to relate variables to one another. The invention automatically populates the interaction tables based on trends detected during system operation. The interaction tables identify potential cause and effect relationships between monitored performance variables. This provides an indication to the manager of what causes a parameter to change as a function of input data and can significantly aid in improving the efficiency of the organization.

Still another technical advantage of the present invention is that it reacts to external changes that affect the organization. These external effects may be, for example, a cyclical or repetitive event such as the particular day of the week or a single or isolated event such as a presidential election or severe weather conditions. The present invention considers these external changes and provides an even more accurate picture of the organization's general efficiency.

BRIEF DESCRIPTION OF THE DRAWINGS

The invention in its modes of use and advantages are best understood by reference to the following description of illustrative embodiments when read in conjunction with the accompanying drawings, wherein.

DETAILED DESCRIPTION OF THE INVENTION

The present embodiment of the present invention is best understood by referring to the FIGUREs wherein like numerals are used for like and corresponding parts of the various drawings.

The present embodiment of the present invention provides a method and system for monitoring and controlling the performance of an organization. The method includes the use of formulae and steps that give efficiency ratings for the organization as a whole, as well as ratings at the group or functional level. This performance monitoring process is augmented by a limited representation of the organization. The framework providing this representation is a series of tables that show how performance variables interact. The method makes use of deviations from an expected operation to help management identify an area that needs better control.

Figure 14:
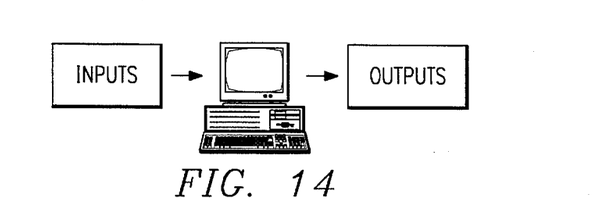
FIG. 14 illustrates an exemplary digital computer system of the present invention.

The method and system are comfortably applicable to a variety of computing systems. FIG. 14 illustrates a digital computer system for implementing the present invention. The present embodiment, for example, includes a process that first provides a single number describing an organization's performance. This single number focuses management on how the organization is currently operating. The single number is called herein an "efficiency rating" and might be thought of as an impression or overall view of the organization's efficiency.

Figure 1:
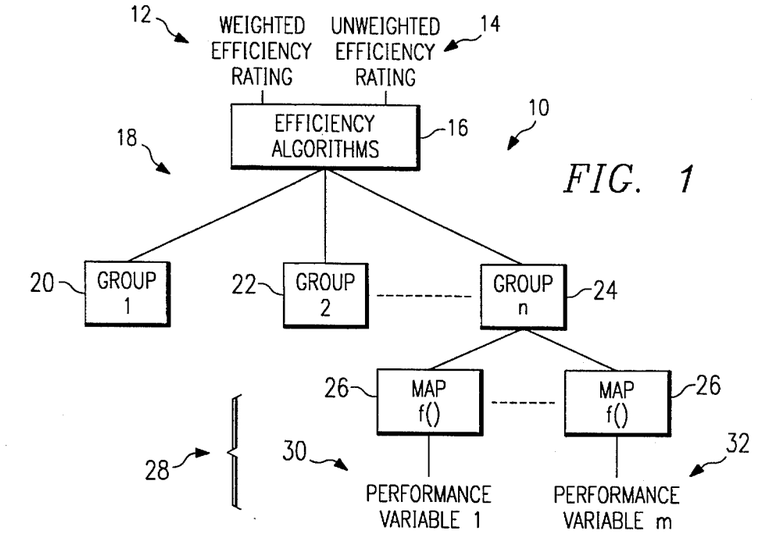
FIG. 1 provides a functional diagram of the efficiency rating process of the present embodiment.

To illustrate the present embodiment of the present invention, FIG. 1 shows the efficiency rating process flow diagram 10 for generating a weighted efficiency rating 12 and unweighted efficiency rating 14. Weighted efficiency rating 12 and unweighted efficiency rating 14 are the outputs of efficiency algorithms 16 as applied at group level 18 to all of the groups within an organization. In particular, reference numeral 20 designates group 1, reference numeral 22 designates group 2, and by abbreviated representation reference numeral 24 represents groups through group n. Each of the groups 18 within an organization makes use of mapping functions 26 to map the values of their associated performance variables 28 to an interpretation formed by well-defined functions. In FIG. 1, performance variable 1 is designated by reference numeral 30 and performance variable m relates to reference numeral 32.

The present embodiment provides details at group level 18 to help pinpoint trouble areas. A group, such as group 1 at reference numeral 20, might represent a branch of the organization like sales or development, or perhaps depict business indicators like revenue and expenditures. Groups are internal to the system and are places where performance variables 28 congregate. Associated with each group is a weighting factor that determines the relative importance of group performance variables 28 to the efficiency of the organization. Details at group level 18 are expressed in terms of how a group contributes to its parent organization's overall rating. This contribution may be positive, negative, or inconsequential. A group rating is available as its numerical effect on the efficiency rating of the organization and as a signed percentage of the group's maximum possible contribution or detriment.

Performance variables 28 link the real world with the system of the present embodiment by providing data from measurable areas of the organization. Setup of the system, therefore, includes appropriately choosing performance variables 28 and describing their characteristics. One characteristic of performance variables is to which group the performance variables belong. The efficiency rating at group level 18 depends on the performance variable according to the variable's relative weighting within the group and its current place within its operating range.

A set of ratings may be enough for management to detect a changing trend in an organization. The ratings alone, however, are not sufficient to determine exactly what has changed. The ratings indicate how the changes have affected the organization and its groups. They do not directly pinpoint what has changed. Thus, not only does the method and system of the present embodiment provide quantitative information about the organization, the present embodiment also dynamically tracks the interactions of an organization and detects deviations from the typical interactions. This process occurs through the use of interaction tables.

Figure 2:
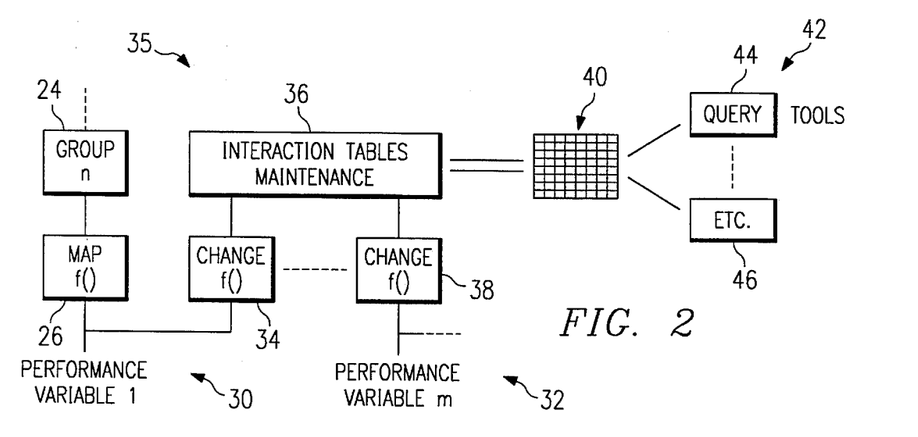
FIG. 2 provides a functional diagram of the interaction table formulation and maintenance process of the present embodiment.

To conceptually illustrate the process of creating and maintaining interaction tables, FIG. 2 shows a flow diagram of interaction table process 35. Beginning with performance variable 1 at reference numeral 30, not only does mapping function 26 normalize the value for performance variable 1 for use by group function 24, but also change function 34 determines the existence of a change in performance variable 1 from time to time and outputs a change indication to interaction tables maintenance function 36. This occurs for all performance variables 28 including performance variable m at reference numeral 32. That is, for example, performance variable m is an input to change function 38. Change function 38 provides an input to interaction tables maintenance function 36. The result of interaction tables maintenance function 36 is an updated interaction table 40 that defines relationships among the performance variables 1 through m. As FIG. 2 further illustrates, interaction table 40 also permits the use of tools 42, including for example, query 44 and miscellaneous other tools as block 46 connotes.

Interaction table process 35 of FIG. 2 recognizes that management is well aware of the intent or theory of an organization. Interaction maintenance process 35, however, provides a contrast of management's theory by tracking the actual interactions of the organization. The various interactions are detected by the system and stored in multiple interaction tables such as interaction table 40. The result is an authentic model that changes with the organization. This information permits management to contrast the theoretical and factual aspects of an organization's performance.

Figure 3:
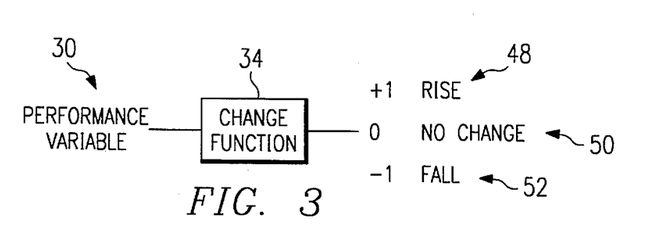
FIG. 3 provides a conceptual flow diagram of the output of a change detection function of the present embodiment.

Interaction table process 35 may be used independently of efficiency rating process 10. Performance variables 28 are used as low level input to interaction table process 35 when interaction tables 40 are tied to the efficiency rating process 10. In operation, interaction table process 35 first determines what, if any, performance variable values have changed. FIG. 3 illustrates the operation of a change function such as change function 34 of FIG. 2. Just as performance variable 28 is mapped before being considered in efficiency rating process 10, it is also preprocessed before being considered in interaction tables process 35. This preprocessing is arranged during the definition of performance variables 28. The performance variable's definition references a function that defines change. This reference includes parameters necessary to satisfy change function 34.

The result of activating change function 34 is a value that specifies what has happened to the performance variable 28. The performance variable 28 has either gone up, dropped, or it has stayed the same. Change function 34 only reports significant changes between the variable's current measurement and its standard value. Change function 34 allows the user to specify how much of an upward rise or downward fall is significant to the organization. Change functions 34 that the present embodiment includes are a relative change and a percent change function. The percent change function uses a percentage of the reference value to compute the lower bound and another percentage of the reference value to compute the upper bound of an interval. The relative change function uses absolute numbers to compute the bounds of this interval. For example, suppose that performance variable 30 changes beyond a specified interval. Change function 34 will output either a +1 to indicate a rise in the performance variable 28 value beyond the applicable interval (as reference numeral 48 designates), a zero value in the event that no change in the variable occurs outside the specified interval (as reference numeral 50 identifies), or a −1 in the event of a fall in performance variable 30's value outside the interval (as reference numeral 52 indicates).

Figure 4:
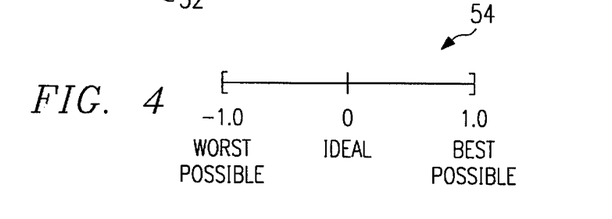
FIG. 4 provides an interval representation of a performance variable according to the present embodiment.

Performance variables 28 are mapped by the rating system into the interval [−1.0, +1.0]. FIG. 4 illustrates an example of a range 54 of values for a mapped or normalized performance variable consistent with the concepts of the present embodiment. For example, in range 54, a worst possible value for a performance variable is −1. The ideal value for the performance variable is 0. The best possible value within the range is a +1.0. Generally, range 54 is continuous so that a mapped performance variable may take a value anywhere in the range from −1.0 to +1.0. In the present embodiment, mapping functions 26 are called out in the characteristics of performance variables 28. Each mapping function 26 requires parameters that describe the associated performance variable's neutral value and location of inflection points in the resulting mapping. The inflection points describe where the effect or influence of a performance variable's measured value on the organization's efficiency changes.

The process of mapping or normalizing a performance variable within range 54 is configured by specifying a mapping function and various parameters when the performance variable is defined.

Given mapping parameters and a measured value for a performance variable, the method and system of the present embodiment yield a number that quantifies the performance variable's position in operating range 54. This number is used internally for the computations of efficiency rating process 10 (FIG. 1). Therefore, the magnitude of this interval value represents the performance variable's distance from its neutral value, and its sign indicates whether the performance variable is a positive or a negative influence on the organization. This interval representation of range 54 allows a group to contain variables that are measured in different units. A group might, then, contain revenue and expense variables along with customer satisfaction ratings, for example. The units are effectively normalized because an efficiency mapping function produces a rating on how a performance variable is currently doing relative to its ideal value.

Three mapping functions are part of the present embodiment. One of these functions is referenced by name upon defining each performance variable. The mapping functions include an ideal goal function (FIG. 5), an ideal cost function (FIG. 6), and an ideal peak function (FIG. 7).

Figure 5:
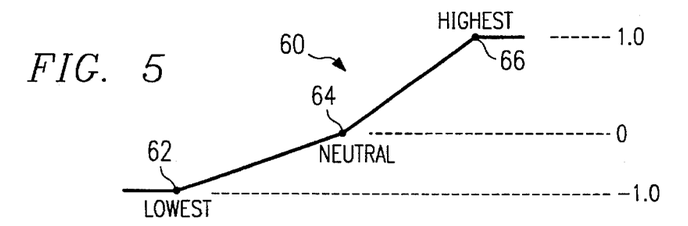
FIG. 5 conceptually illustrates the ideal goal mapping function of the present embodiment.

The ideal goal function is usable when an increase in a variable is deemed good even if it exceeds the neutral value. FIG. 5 conceptually illustrates the ideal goal function 60 that applies to a performance variable within the range [−1.0, +1.0]. According to FIG. 5, the lowest mapped value for any variable mapped according to the ideal goal function 60 is the value of −1.0 as point 62 illustrates. At the ideal value, ideal goal function 60 takes the neutral position of point 64. Point 64 represents an inflection point for ideal goal function 60, in that beyond point 64 the value of the normalized performance variable affects group performance either more or less significantly than before. The highest value that a mapped performance variable can assume is 1.0 as point 66 shows. An example of using ideal goal function 60 may be for rating a sales person. The ideal value, therefore, could be a sales quota. The upper limit might be the value for making the achievement club and, perhaps, the lower limit would be the value at which the sales person should consider pursuing another revenue source.

Figure 6:
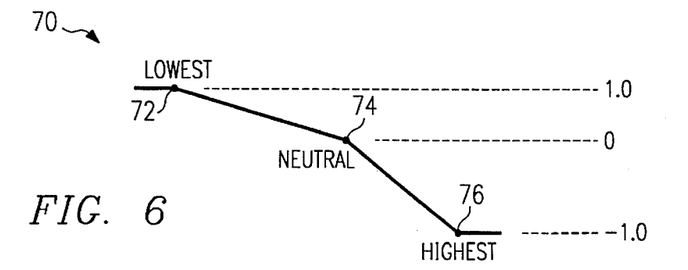
FIG. 6 conceptually illustrates the ideal cost mapping function of the present embodiment.

FIG. 6 shows the mapping of the ideal cost function 70 beginning at lowest cost point 72 at which point of value of +1.0 is assigned to the normalized performance variable. At point 74, a neutral value exists and the normalized performance variable takes the value of 0. Point 74 may be considered an inflection point for ideal cost function 70. At point 76, the normalized performance variable is −1.0 at which point the input performance variable has its expected highest value. Ideal cost function 70 is, therefore, the inverse of ideal goal function 60. It is used for things like expenditures and costs of goods sold. Highest point 76 and lowest point 72 for ideal cost function 70 describe a performance variable's usable or expected range. As with the other map functions, these points may be configured as a percentage deviation from the neutral value or as absolute deviations from the neutral value.

Figure 7:
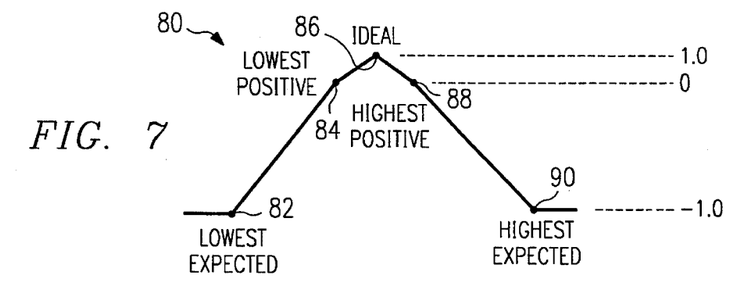
FIG. 7 conceptually illustrates the ideal peak mapping function of the present embodiment.

FIG. 7 shows a mapping of the ideal peak function 80. When an input performance variable for which ideal peak function 80 applies equals or is less than the lowest expected value, ideal peak function 80 assigns the value of −1.0, as point 82 indicates. As the performance variable value increases, ideal peak function 80 causes the associated normalized performance variable to increase to a value of 0.0. Lowest positive value 84 represents this point for the normalized performance value with a 0.0 normalized mapped performance variable value. At the ideal value, the mapped performance variable assumes the value of 1.0 as point 86 shows. As the performance variable further increases in value, it passes through point 88 where ideal peak function 80 assigns the value of 0.0 to represent the highest positive value that the performance variable should assume. Beyond that point, the normalized performance variable will decrease in value to point 90 where it assumes the value of −1.0 to represent the highest expected value of the performance variable.

Ideal peak function 80 has use in tracking variables that should remain fairly constant. In a call center environment, for example, an agent's talk time would most likely be traced through ideal peak function 80. If talk time is too low or too high, then a problem is apparent. Efficiency, therefore, should drop. Note that in ideal peak function 80, points 84, 86, and 88 may be considered inflection points between the lowest and highest limits. Point 86, however, differs in that not only does the slope change, but also the slope value changes sign from positive to negative as the performance variable value increases. These points define the turning points between good and bad effects of a variable.

Once an understanding develops of how change function 34, ideal goal function 60, ideal cost function 70 and ideal peak function 80 operate, it becomes important to understand other functions of the present embodiment. A next step, then, is to understand the operation of the method and system to produce group efficiency ratings. Ratings of groups 18 directly affect the overall efficiency rating of an organization. In contrast, performance variables 28 are mapped and then used to produce group ratings. They belong to one and only one group, and they do not directly affect the overall efficiency rating of an organization. Performance variables 28 indirectly affect the overall efficiency rating by influencing a group's individual rating. A performance variable 28 whose weight is set disproportionate to the other variables in the group may bias the group's rating. This influence is ultimately limited to the group's influence on the overall efficiency rating. As such, the most sensitive weight settings in the configuration of the present embodiment are the group weights.

In light of this fact, and considering results from trial runs of the insert system, group weights are capable of distorting the true picture of the organization. Suppose, for example, that the user accidentally sets a group weight too high. If this particular group consistently has a positive impact on the efficiency rating, then it may be difficult for negatively impacting groups to gain attention. Of course, the same argument is true for group weights set too low and for positively impacting groups. The point is that a user may be fooled by the present method and system if the group weights are disproportionate. Weights at group level 18 are too important to abandon, so the present system addresses this issue by making two sets of computations. One computation uses the user-defined group weights to yield weighted efficiency rating 12. The unweighted efficiency rating 14 derives from simply assuming that all groups are weighted equally. Comparing weighted efficiency rating 12 and unweighted efficiency rating 14 at group level 18 gives the user a notion of how the group weights bias results.

Performance variables 28 are always weighted. An organization's unweighted efficiency rating 14 is calculated by assuming that all performance variable groups have the same weight. Because performance variable weights are always used, a calculation that is common between weighted efficiency rating 12 and unweighted efficiency rating 14 is a ratio R for each variable group. The ratio R is calculated for every variable group in the system and in the interval [−1.0, +1.0]. If R is negative, then the group as a whole is a detriment to the organization's efficiency rating because it is performing below its ideal (or targeted) level. If R is zero, the group is not a good or a bad influence on efficiency. If R is positive, then the group is performing above its ideal level, and it is a benefit to the organization's efficiency rating. The following computation provides one way of deriving the ratio R:

$$R = \sum_{x=1}^{n} \frac{W_x M_x}{\sum_{i=1}^{n} W_i |M_i|} \quad (1)$$

Where:
(a) W=weight of the $X^{th}$ performance variable in the group, W>0;
(b) M=mapped value of the $X^{th}$ performance variable, [−1,1]; and
(c) n=number of performance variables in the group, n>0

Given R and assuming equal weights for each group at group level 18, unweighted efficiency rating 14 (UER) may be calculated as follows:

$$UER = \frac{G + \sum_{g=1}^{G} R_g}{2G} = 0.5 + \frac{\sum_{g=1}^{G} R_g}{2G} \quad (2)$$

Where:
G=the total number of groups in an organizations configuration

UER 14 is a number in the interval [0, +1.0]. If UER 14 has a value of 0.5 or 50%, this means that everything is operating at an ideal level, or more realistically, that the positive influences in the organization balance equally with the negative influences in the organization.

The contribution to UER 14 for a particular group f is:

$$U = \frac{R_f}{2G} \quad (3)$$

This is a number in the interval [−½G, +½G]. UER 14 having a value of 0.5 is the base line, so UER can also be expressed as:

$$UER = 0.5 + U_1 + U_2 + \ldots + U_G \quad (4)$$

Unweighted efficiency rating 14 gives the user a notion of how the group's weights are biasing the organization's weighted efficiency rating 12. UER is only intended as a cross check for the user. Applying weights to each group gives the weighted efficiency rating (ER) 12 as follows:

$$ER = \frac{\sum_{f=1}^{G} W_f + \sum_{f=1}^{G} W_f R_f}{2 \sum_{g=1}^{G} W_g} = 0.5 + \frac{\sum_{f=1}^{G} W_f R_f}{2 \sum_{g=1}^{G} W_g} \quad (5)$$

As with UER 14, ER 12 is a number in the interval [0, +1.0]. Group f's contribution to ER 12 is calculated as follows:

$$E = \frac{W_f R_f}{2 \sum_{g=1}^{G} W_g} \quad (6)$$

Once again, ER 12 having a value of 0.5 is the efficiency rating base line, so:

$$ER = 0.5 + E_1 + E_2 + \ldots + E_G \quad (7)$$

Note that weighted ER 12 is intended to focus management's attention. Similar ratings are produced for each group at group level 18 in the organization. These also serve to focus management's attention. The ratings themselves have not suggested any specific trouble area beyond the group level.

Figure 8:
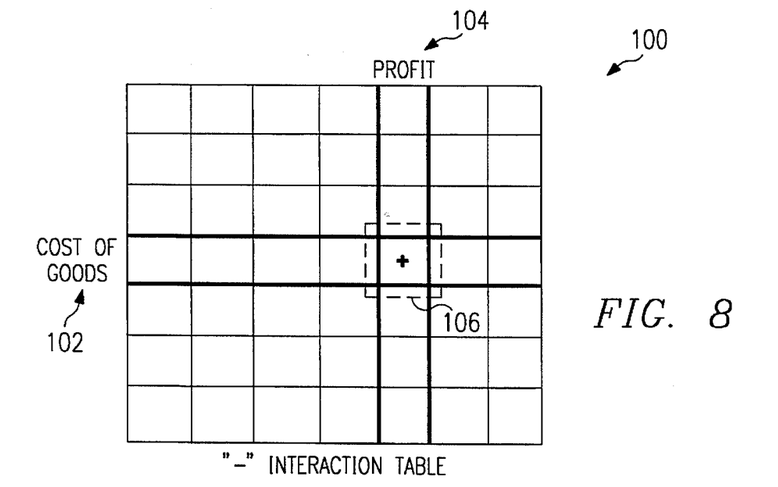
FIG. 8 illustrates an interaction table according to the present embodiment.

As already explained in general, the present embodiment not only provides quantitative information about the organization, it also furnishes interaction information among performance variables 28. FIG. 8, therefore, illustrates conceptually interaction table 40 what might result in the profit performance variable in the event of a decrease in a cost of goods sold. For example, interaction table 40 includes along its side a performance variable for the cost of goods sold at reference numeral 102. In this example, cost of goods sold performance variable 102 operates as an independent performance variable. The reaction to a decrease in the cost of goods sold by the profit performance variable 104 is represented by the "+" in cell 106. This represents the intersection between the performance dependent profit variable 104 and cost of goods independent performance variable 102. This may be taken as meaning that for a negative change or fall in cost of goods sold performance variable 102, a positive effect occurs on profit performance variable 104 as indicated by the "+" in cell 106.

Algorithms that use and maintain interaction tables 40 treat performance variables 28 as co-dependent variables. Interaction table 40 is two dimensional in representing how a given change in the row variable affects the column variable. Each performance variable 28 is assigned a selector value that is used for row and column addressing. The row variable, for example, cost of goods performance variable 102, may be considered the independent or acting variable and the column, for example, profits performance variable 104, variable may be considered the dependent or reacting variable. Given an acting variable and its classification, the method and system of the present embodiment can query interaction table 40 to determine how an acting variable change affects the remaining variables.

Performance variable classifications are produced by change functions, and one interaction table can exist per classification. As a result, for a given view of an organization, up to three interaction tables 40 are possible. In the present embodiment, each interaction table represents a square matrix. So if n performance variables 28 are involved, then without any attempt to minimize data storage requirements, each interaction table 40 will have $n^2$ cells.

Interaction table 40 entries store values that describe the observed relationships between the acting (row) variable and the reacting (column) variable. To determine how interaction table 40 should depict the relationship between two variables, consider the realistic combinations of two changing numerics. Given either a rise, a stable level, or a fall in one variable, its effect on another variable can be described using the symbols of Table 1.

TABLE 1

| Symbol | Comments |
| --- | --- |
| + | reacting variable rises |
| − | reacting variable falls |
| N | reacting variable stays the same |
| u | reacting variable will not rise (it either falls or stays the same) |
| d | reacting variable will not fall (it either rises or stays the same) |
| n | reacting variable will not stay the same (it either rises or falls) |
| * | no clear trend |

Referring to FIG. 2, interaction table maintenance module 36 produces one of the above entries for each cell in interaction table 40. The entries are the result of examining statistics that are collected by interaction table maintenance modules 36. Interaction table maintenance module 36 calculates its results on the observed interaction of the variables over several samples. Consequently, interaction table 40 entries represent how performance variables 28 are actually interacting rather than the theory of how they should interact. In contrast, if the user were to manually fill in interaction table 40, then the table would represent the theory of how variables should interact. Interaction table maintenance module 36 assures that the present method and system change as the organization changes, while remaining stable enough to detect short term deviations. The present method and system use multiple interaction tables such as interaction table 40 to provide up-to-date and objective information about an organization's interactions.

The present embodiment uses interaction tables 40 to store a model of the current interactions of an organization's key indicators. When used with the efficiency rating as part of the present embodiment, these key indicators are the performance variables 28 that the user has defined. After producing an efficiency rating, the system proceeds to match current interactions amongst performance variables 28 against the stored model. The present embodiment presents a ranked list of performance variables 28 that deviate from the organization's model. This list provides specific information to management on areas that have suddenly changed.

A deviation from the model is a mismatch between the current relationship and the stored relationship between two performance variables 28. If a model says, for example, that a rise in performance variable A is correlated to a rise in performance variable B and the current sampling indicates otherwise, then a deviation would be noted. Both the acting and reacting variables are implicated by a deviation, so at least two ways exist to count deviations from the model. The first approach is to count the deviation against the acting variable. Accumulating deviations in this manner allows detection of weakening or changing relations between the acting variable and certain reacting variables. A ranked list of acting variables is really a list of variables whose relations, if the current situation persists, are subject to change in the model. Another method counts deviations against the reacting variable. Accumulations from this technique imply that something external to the model has affected the reacting variable. The invention allows either approach to be used without departing from the spirit or scope, but the latter gives more valuable input for keeping an organization on track, so the present system prefers to issue a ranked list of reacting variables to help the user determine why his efficiency rating has changed.

The following discussion more particularly describes operation of the interaction table query tool 44, as applied to interaction table 40 of FIG. 8. For example, suppose that cost of goods performance variable 102 is the acting variable of interest and one wishes to know its effect on the organization being modelled. A first step of module 44 is to select the row associated with cost of goods performance variable 102 in interaction table 40. Then each table entry in that row is scanned for significant relations. Eventually, the reacting variable profit is implicated because, in this example, cost of goods performance variable 102 falling ties to profits changing. The resulting cell entry indicates that, based upon past history, this will cause profit variable 104 to rise when cost of goods variable 102 falls.

The present embodiment also addresses the question of what happens when the system has not encountered the particulars being queried. This situation is easily detected by examining the statistics of the acting variable's row. If the system has never witnessed cost of goods falling, then the implicated row statistics will all be nil. Thus, interaction table 40 naturally supports a system that must know when it reaches its limits of experience.

In keeping with the above example, "What would cause profits to rise?" is a viable question. With this question profit performance variable 104 is a reacting variable, so its columns in the various interaction tables such as interaction table 40 are searched for the "+" symbol. During this kind of query, the system searches all interaction tables because a specific interaction table implies the acting variable's classification. Therefore, each interaction table is capable of storing the desired relation. If the system has never witnessed profits rising, then the implicated columns of the various interaction tables will have nil statistics for profits rising. The interaction tables may, however, have counts of events where profit has fallen or stayed the same.

An interesting characteristic of interaction table 40 is the ability to detect boundaries of the stored model. The user may define key indicators that, at least in theory, should have an effect on the organization, but perhaps for some reason the intended effects are not being realized. Modeling an organization by storing and tracking interactions allows the method and system of the present embodiment to detect boundary segments of the model, because variables that do not affect other variables will have zero or nil row statistics. Likewise, if the column statistics of a variable are nil, then the model has no knowledge of how to affect that variable.

At the start of the interaction table maintenance module 36 operation, each performance variable 28 in the system is classified using its change function 34 and a reference value. The classification of a performance variable 28 indicates whether the variable has risen, stayed the same, or has fallen. A reference value necessary for classifying the performance variable is selected based on a previous measurement, the day of week, an ideal value, or some other relevant criteria. If this is Monday and the reference values chosen are from one week ago, then interaction table 40 will be a model of how the organization typically interacts on Mondays.

One purpose of classifying each performance variable 28 is to accumulate statistics concerning how performance variables 28 tend to interact. One counter is maintained per classification for each performance variable combination. Each cell of an interaction table 40 is supported by three counters. For example, a system with n variables has $n^2$ entries per interaction table 40, so without any attempt to minimize data storage requirements, there are $3n^2$ discrete counters or statistics to store. If the system has received a new sample for its performance variables 28, then the pseudocode for adding the samples to the interaction tables could be as shown below in Table 2:

TABLE 2

Using the current samples/classifications to be added to the system
For each performance variable $A_n$
    Select the interaction table corresponding to $A_n$'s classification
    For each remaining variable $R_n$
        Select interaction table entry $[A_n,R_n]$
        Increment the statistic corresponding $R_n$'s classification
    End for
End for If a set of statistics are backed out of the present system when a new set of statistics are introduced, then a low pass filter has been implemented. The effect, as Table 3 shows, is a model that changes with the organization, but that is stable enough to aide in detecting short term deviations.

TABLE 3

Using the samples/classifications to be backed-out of the system.
For each performance variable $A_n$
    Select the interaction table corresponding to $A_n$'s classification
    For each remaining variable $R_n$
        Select interaction table entry $[A_n,R_n]$
        Decrement the statistic corresponding $R_n$'s classification
    End for
End for To convert cell 106 statistics to a relational symbol, it is necessary to take each of the three numbers, rank them, examine the ranking, then choose one of the seven relation symbols. The statistics give the number of times that a variable either rose, fell, or stayed the same in a specific situation or instance of a particular variable. Ranking these numbers requires that an interval of equivalence is established. If a variable, for example, rises 100 times, falls 99 times, and stays the same 2 times, then the rise and fall times are reasonably equivalent. There are many algorithms that the present embodiment could use to establish an equivalence interval. One example is to take the highest statistic and call any number within 10% of that statistic equivalent.

The ideal situation is for a clear choice to exist. In this case, the second and third place numbers are of no concern because the prevailing trend is immediately apparent. In the present embodiment, a tie for first is possible. This situation is resolved by considering the remaining statistic. The reacting variable will not react according to the remaining statistic, but it may follow either of the first place statistics.

TABLE 4

| Ranking | Resulting Symbol | Comment |
| --- | --- | --- |
| 1,1,1 | * | No clear trend |
| 1,1,2 | u, d, or n | Tie for first |
| 1,2,3 | +, −, or N | Clear trend |
| 1,2,2 | +, −, or N | Clear trend with a tie for second |

The raw form of interaction tables 40 represent what has been observed. No guarantee exists, however, that the relations are consistent from one interaction table 40 to another. Post-processing algorithms examine the relations across interaction table 40 boundaries.

The present embodiment has the ability to respond to external events to help a manager understand how they affect the organization's efficiency rating and interaction amongst the performance variables. Thus, once the method and system has a set of satisfactory performance variables 28, it is possible to assess how an external event varies the organization's response. In deriving an efficiency rating, therefore, the process is to select several parameters that related to the performance of an organization as efficiency performance variables 28. The method and system measure these performance variables 28 for a period of time to derive efficiency ratings, which are functions that describe the values of those performance variables 28 at various instances of time. From the efficiency measurements, the present embodiment constructs interaction tables 40 that describe the expected change of one performance variable when another performance variable changes. Based on interaction table 40 answers the present embodiment permit manager queries such as how to improve a performance variable 28 or what if a performance variable 28 increases.

In the method and system, external events are the occurrence of some incident at some instance of time and that may happen repeatedly at some other instances of time. For example, an event can be a stock crash where the stock crash is defined to be that the Dow Jones index drops more than 20% in one day. Other examples of parameters associated with external events may be Friday afternoon, a presidential election, rain, a full-moon, etc. An external event should be sufficiently re-occurring to derive a conclusive statement about the correlation of the event and the efficiency-rating. For example, if the stock index rarely drops more than 20% in one day, then the present system could change the threshold to 10% or even 5% so that the event happens more frequently.

Figure 9:
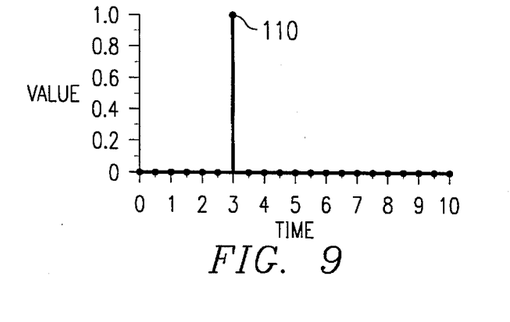
FIGS. 9 and 10 illustrate impulse functions that may be used with the present embodiment.
Figure 11:
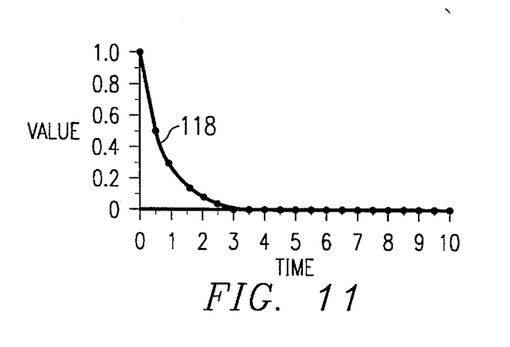
FIGS. 11 and 12 illustrate impulse response functions for use with the present embodiment.
Figure 12:
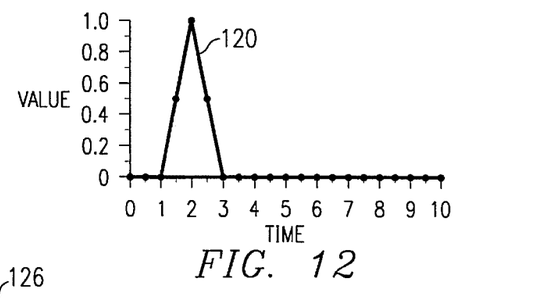

The occurrence of an event may be modeled mathematically as an impulse function at that instance and, if the event happens many times, it may be modeled as a sequence of impulse functions. FIG. 9, therefore, shows an example of impulse function at point 110. FIG. 11 shows a sequence of impulse functions at points 112, 114 and 116. The impact of an event can be modeled automatically by an impulse response function which describes how strong the impact will be at various instances of time after the event happens. FIG. 11 shows a sample impulse response function at curve 118, and FIG. 12 shows another sample impulse response function at curve 120.

Figure 13:
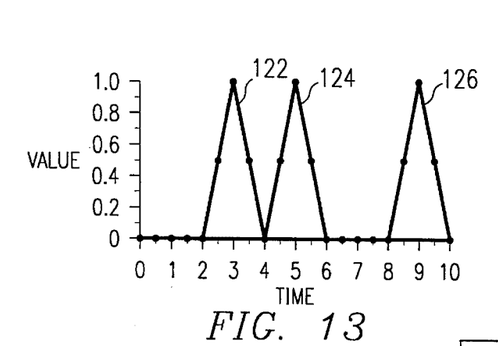
FIG. 13 illustrates a convolution of FIG. 10 and FIG. 12 for modeling an aspect of the present embodiment.

If an event happens many times, the impact of this event can be modeled by the convolution function of the sequence of impulses and the impulse response function at curve 122. FIG. 13 at the curve 122 illustrates at curve 122 the convolution of FIG. 10 and FIG. 12. With the modeling approach of the present embodiment, events can be modeled as variables and the efficiency-rating and interaction tables comfortably handle both performance variables 28 as well as external events. FIG. 13 shows how the impulse function of an event may be thought of as the measurement function of a performance variable 28. As far as the system of the present embodiment is concerned, an event may be considered as equivalent to a performance variable.

Figure 10:
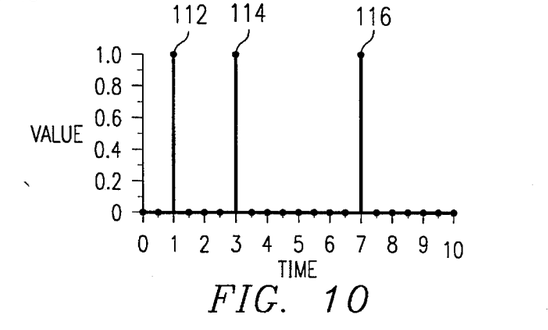

An important consideration in modelling external events is the search for the appropriate impulse response function of an event. The choice of the impulse response function of FIGS. 9 and 10 is crucial to the derivation of interaction table 40 because an improperly chosen impulse response function may result in an incorrect interaction table 40. The following discussion, therefore, addresses the issue on how to find the most correlated impulse response function for an event. An improperly chosen impulse response function usually results in missing an existing correlation, instead of showing a false correlation. This means a strong correlation indicates that the correlation indeed exists. A weak correlation, on the other hand, may simply indicate a bad choice of the impulse response function and, therefore, indicate the need for further investigation.

For the purposes of the present method and system, the main parameters of the impulse response function are the delay, duration, and the shape of the function. The delay describes how long it takes for an event to influence the efficiency-rating. The duration describes how long the impact lasts. The shape describes the relative strength of the impact. In accordance with the present invention, many impulse response functions with varying delays, durations, and shapes can be examined to find out which one results in the strongest correlation. Then, the present embodiment selects that one strongest correlated function as the most appropriate impulse response function. An example search algorithm is to use the steepest-descent search when some correlation is detected and to use the random search when no correlation is discovered. There are many search algorithms that the present embodiment can use to solve this problem. If, on the other hand, no impulse response function shows a strong correlation, it is likely that this external event is unrelated with the efficiency-rating. If there exists an impulse response function that shows strong correlation, the external event can indeed change the efficiency-rating.

In summary, there is shown as one embodiment of the present invention a method and system for generating performance data relating to the efficiency of an organization that includes the necessary steps of and instructions for describing a plurality of performance variables associated with the organization. The performance variables associate with a measurable property of the organization. Mapping each of the plurality of performance variables to a normalized performance variable according to a neutral or ideal value and at least one inflection point of the performance variable within a normalized range of values is another function of the present invention. The inflection point generally describes effects of said normalized performance variable in changing from a positive influence to a negative influence on the organization's efficiency. The invention assigns a weighting factor to each of the normalized performance variables to produce a plurality of weighted normalized performance variables. The weighting factor relates to the importance of each of the normalized performance variables to the efficiency of the organization. The method and system calculate the efficiency of the organization as a function of the plurality of weighted normalized performance variables.

The method and system of the present invention also include the process of and instructions for constructing and maintaining interaction tables, as well as the ability to query interaction tables. Such queries could include queries such as "what in fact would happen if I changed the 'x' performance variable" or "what would cause a change of 'y percent' in the 'z' performance variable?" The present invention employs change functions for constructing and maintaining interaction tables and to compare current measurements against the interaction tables. Therefore, a list of deviations can be produced by acting variables as well as by reacting variables. Furthermore, the present invention permits external events to be transformed into performance variables by using impulse and impulse response functions. These impulse and impulse response functions permit external events to be employed in efficiency rating calculations as well as in the formation of interaction tables.

Another embodiment of the present invention applies to a call traffic processing center, such as an airline reservation center, will be described. Such a call center is usually operated in one room with telephone operators (agents) numbering from twenty to one thousand. A call center is created to handle a large volume of generic calls by using an Automatic Call Distributor System (switch). As a call comes in to the call center, the switch literally "switches" the call to the next available agent for handling. Obviously, the success of a call center depends upon customer satisfaction, which is related to many variables including the length of time before the phone is answered, the length of time on hold, and so on. To demonstrate the operation of the invention, the method will be applied to a limited number of variables.

The first step of the method comprises selecting the performance variables to be measured. Ideally, all of the organization's variables should be measured. However, if only the variables considered most important are included, the method will still provide valid results.

In addition to selecting the variables to be measured, default values may be assigned for those variables. If a variable is unavailable at any time the method is being performed, its default value may be used to allow the method to be continued. If the default values are carefully selected, their use will not cause significant errors in the method's results.

The following call traffic processing center variables will be used to demonstrate the invention:

handled calls (HC)—the number of calls answered by the center's agents;

abandoned calls (AC)—the number of calls in which the caller hung up before being answered by and agent;

line talk time (LTT)—the time during which the agents were speaking with callers on the telephone lines;

line abandon time (LAT)—the time callers who abandoned their calls were waiting on the telephone lines;

line idle time (LIT)—the time during which the telephone lines were unoccupied;

agent talk time (ATT)—the time during which agents were speaking with callers on the telephone lines;

agent work time (AWT)—the time during which agents were completing caller transactions, but were not talking with callers; and agent idle time (AIT)—the time during which the agents were not available to perform their functions.

The variables are components of the following:

processed calls (PC)=HC+AC;

line available time (LT)=LTT+LAT+LIT; and agent sign on time (AT)=ATT+AWT+AIT.

After the variables to be measured are selected, a fractional weight is assigned to each variable and each variable is characterized as either positive or negative. The fractional weights reflect the subjective relative importance of each variable, as seen by the manager or user of the method. The sum of the fractional weights is one. The positive or negative characterization of variable depends upon a subjective determination as to whether an increase in that variable is seen to affect the performance of the organization favorably or unfavorably.

By assigning fractional weights to the variables and characterizing the variables as positive or negative, one essentially defines "good performance" for the organization. Thus, if one changes the fractional weights or characterization of the variables, one changes the definition of "good performance."

For purposes of the example, abandoned calls and agent idle time are each assigned twice the weight of the other factors, indicating their subjective relative importance. As can be seen in Table 3 below, the total of the variable weights is one. Abandoned calls, line abandon time, line idle time, and agent idle time are characterized as negative, because increases in those variables are seen to decrease the performance of the center.

The variables are then assigned to one of a plurality of groups. Each group contains either positive or negative variables. In addition, each group contains only variables which are components of a particular resource, source of income, or expense. In the example, line abandon time and line idle time are both negative factors and belong to the same resource, line available time; therefore, they are placed together in a group. Similarly, agent talk time and agent work time are positive components of agent sign on time and are placed together in a group. As can be seen in Table 7 below, there are three positive groups and three negative groups in the example.

Two tables reflecting the interaction of the variables are constructed. The first table contains entries showing the expected reaction of each of the variables when another variable is increased and all other variables remain constant. For example, when handled calls increases, what is the expected reaction of abandoned calls, assuming the other variables remain constant? As can be seen in Table 5, the answer is that abandoned calls are expected to decrease. The other table (Table 6) shows the reaction when a variable is decreased.

In the below tables, a "+" entry indicates an increase in the variable listed on the horizontal axis and a "−" entry indicates a decrease.

TABLE 5

| Increasing Variable | Reacting Variable | | | | | | | |
|---|---|---|---|---|---|---|---|---|
| | HC | AC | LTT | LAT | LIT | ATT | AWT | AIT |
| Handled calls | | − | + | − | − | + | + | − |
| Abandoned calls | − | | − | + | − | − | − | + |
| Line talk time | − | + | | + | − | + | − | − |
| Line abandon time | − | + | − | | − | − | − | + |
| Line idle time | − | − | − | − | | − | − | + |
| Agent talk time | − | + | + | + | − | | − | − |
| Agent work time | − | + | − | + | + | − | | − |
| Agent idle time | − | + | − | + | + | + | − | |

TABLE 6

| Decreasing Variable | Reacting Variable | | | | | | | |
|---|---|---|---|---|---|---|---|---|
| | HC | AC | LTT | LAT | LIT | ATT | AWT | AIT |
| Handled calls | | + | − | + | + | − | − | + |
| Abandoned calls | + | | + | − | + | + | + | − |
| Line talk time | + | − | | − | + | − | + | + |
| Line abandon time | + | − | + | | + | + | + | − |

TABLE 6-continued

| Decreasing Variable | Reacting Variable | | | | | | | |
|---|---|---|---|---|---|---|---|---|
| | HC | AC | LTT | LAT | LIT | ATT | AWT | AIT |
| Line idle time | + | + | + | + | | + | + | − |
| Agent talk time | + | − | − | − | + | | + | + |
| Agent work time | + | − | + | − | − | + | | + |
| Agent idle time | + | − | + | − | − | − | + | |

The above steps are preparatory. The steps which follow are repeated at regular intervals. The length of the interval will of course vary depending upon the type of organization. In the present embodiment, the steps which follow are accomplished hourly by a digital computer system which obtains data from the call center's switch.

Data comprising the quantity of each variable occurring during a fixed time is collected. Table 7 below shows the data for the example. Table 7 also shows the weights of each variable and the groups to which they are assigned.

TABLE 7

| Variable | Weight | Measured Value | Group |
|---|---|---|---|
| Handled calls | .1 | 1000 calls | A |
| Abandoned calls | .2 | 50 | B |
| Line talk time | .1 | 21600 sec. | C |
| Line abandon time | .1 | 1440 | D |
| Line idle time | .1 | 5760 | D |
| Agent talk time | .1 | 21600 | E |
| Agent work time | .1 | 4320 | E |
| Agent idle time | .2 | 2880 | F |

Next, a variable ratio for each variable is calculated using the following formula:

$$VR = V/T, \qquad (8)$$

where

VR=the variable ratio,

V=the variable, and

T=the sum of the variables which are components of the resource, source of income, or expense of which the variable is a component.

In the example, handled calls (1000 calls) is a component of processed calls (1050) calls. Therefore, the variable ratio for handled calls is 1000/1050=0.95. The variable ratios for all variables are shown in Table 8.

A weighted variable ratio is then calculated using the following formula:

$$WVR = VR \times W \qquad (9)$$

where:

WVR=the weighted variable ratio,

VR=the variable ratio, and

W=the fractional weight assigned to the variable.

Continuing the example, the weight assigned to handled calls is 0.1. Therefore, the weighted variable ratio for handled calls is 0.95×0.1=0.095. The weighted variable ratios for all the variables are shown in Table 8.

TABLE 8

| Variable | Ratio | Weighted ratio |
| --- | --- | --- |
| Handled calls | 0.95 | 0.095 |
| Abandoned calls | 0.05 | 0.010 |
| Line talk time | 0.75 | 0.075 |
| Line abandon time | 0.05 | 0.005 |
| Line idle time | 0.20 | 0.020 |
| Agent talk time | 0.75 | 0.075 |
| Agent work time | 0.15 | 0.015 |
| Agent idle time | 0.10 | 0.020 |

The efficiency rating is then calculated using the following formula:

$$ER = 10 \times (0.1 \times N + PWVR = NWVR)/(P+N) \quad (10)$$

where:

ER = the efficiency rating,

N = the number of negative variable groups,

P = the number of positive variable groups,

PWVR = the sum of the weighted variable ratios of positive variables, and

NWVR = the sum of the weighted variable ratios of negative variables.

As seen in Table 7, there are three positive variable groups in the example and three negative variable groups. Thus, the efficiency rating is $$10[(0.1 \times 3 + (0.095 + 0.075 + 0.075 + 0.015) - \quad (11)$$
$$(0.010 + 0.005 + 0.020 + 0.020)]/(3 + 3) =$$
$$(0.3 + 0.260 - 0.055)/6 = 0.84.$$

The efficiency rating may be compared with several other efficiency ratings in order to determine the trend of the organization's performance. Examples include an ideal rating, an average rating, and a rating for a previous period. The ideal efficiency rating may be calculated using theoretically possible data (data in which all of the negative variables are zero), data which experience has shown to be achievable, or data based upon management's view regarding the optimum values for each variable. The average rating may be taken for the life of the organization, for the previous year, quarter, or month, or for the day of the week, season, etc. Similarly, the previous efficiency rating may be for the period immediately preceding the current period or for the corresponding period during the previous day, week, year, etc. So long as the same average and previous efficiency ratings are used consistently, the invention will yield valid results.

Returning to the example, assume that the ideal efficiency rating is 0.92, the average rating is 0.87, and the last period's rating is 0.83. Comparing the efficiency rating for the current period calculated above with the assumed efficiency ratings, current vs. ideal: the current rating is 0.84/0.92= 0.91= 91% of the ideal rating;

current vs. average: the current rating is 0.84/0.87=0.97= 97% of the average rating; and current vs. previous period: the previous period rating is 0.83/0.84=0.99=99% of the current period rating. Note that the maximum value that may be achieved in this comparison is 100%, as the two ratings are inverted when the current rating is greater than the rating to which it is compared.

In addition to comparing the efficiency rating with other efficiency ratings, the variable ratios and weighted variable ratios may be compared with the corresponding ideal, average, and previous period ratios to determine the deviation of the current ratios from the foregoing ratios. In the example, assuming an ideal handled calls ratio, the deviation of the current ratio is (0.95/0.98)−1=−0.03=3% less than the ideal ratio.

The above comparisons of the current values of variable ratios, weighted variable ratios, and efficiency rating with the ideal, average, and previous period values provide an overall view of the performance of the organization and the trend of that performance.

Next, the current interaction between the variables is compared with the expected interaction of the variables shown in Tables 5 and 6 to determine the number of times each variable's current interaction with the other variables deviates from the expected interaction.

TABLE 9

| Variable | Measured Value | Average Value |
| --- | --- | --- |
| Handled calls | 1000 calls | 1200 calls |
| Abandoned calls | 50 | 70 |
| Line talk time | 21600 sec. | 23700 sec. |
| Line abandon time | 1440 | 1620 |
| Line idle time | 5760 | 3480 |
| Agent talk time | 21600 | 23700 |
| Agent work time | 4320 | 4970 |
| Agent idle time | 2880 | 130 |

Returning to the example and assuming the average variable values shown in Table 9 above, we see that measured handled calls decreased relative to average handled calls. Therefore, we enter the table which shows the actions of the other variables when one variable decreases, Table 6, and compare the expected reaction of each other variable (obtained by reading horizontally from "handled calls") with the actual reaction. That comparison is accomplished as follows:

if handled calls decrease, then

| Expected Reaction | Observed Reaction | Deviation? |
| --- | --- | --- |
| Abandoned calls increase | decrease | yes |
| Line talk time decreases | decrease | no |
| Line abandon time increases | decrease | yes |
| Line idle time increases | increase | no |
| Agent talk time decreases | decrease | no |
| Agent work time decreases | decrease | no |
| Agent idle time increases | increase | no |

As can be seen, the observed reactions for abandoned calls and line abandon time deviated from that expected. Continuing the example, observed abandoned calls is an increase relative to average abandoned calls. Therefore, we perform the above procedure by entering Table 2 and reading horizontally from "abandoned calls" and make the comparison as follows:

if abandoned calls increase, then

| Expected Reaction | Observed Reaction | Deviation? |
| --- | --- | --- |
| Handled calls increase | decrease | yes |
| Line talk time increases | decrease | yes |
| Line abandon time decreases | decrease | no |

| Expected Reaction | Observed Reaction | Deviation? |
|---|---|---|
| Line idle time increases | increase | no |
| Agent talk time increases | decrease | yes |
| Agent work time increases | decrease | yes |
| Agent idle time decreases | increase | yes |

Thus far, it can be seen that there is one deviation each for handled calls, abandoned calls, line talk time, line abandon time, agent talk time, agent work time, and agent idle time. The results from completing the comparisons are shown in Table 10 below.

Next, the percentage of impact on the efficiency rating of each variable is calculated using the following formula:

$$I=100\times D/TD, \qquad (12)$$

where

I=percentage impact of the variable on the efficiency rating,

I=percentage impact of the variable on the efficiency rating,

D=the number of interaction deviations for the variable, and

DT=the total number of interaction deviations.

In the example, the percentage impact for handled calls is 100×5/(5+2+3+2+1+3+4+2)=500/22=22.7%. The results from calculating the percentage impact for all the variables is shown in Table 10 below.

A calculated impact for each variable is then calculated using the following formula:

$$CI=I\times W, \qquad (13)$$

where

CI=I×W, where

CI=the calculated impact of the variable,

I=the percentage of impact of the variable on the efficiency rating calculated above, and W=the fractional weight assigned to the variable above.

The calculated impact for handled calls in the example is 22.7×0.1=2.27. The results from calculating the calculated impacts of all the variables are shown in Table 10 below.

The weighted percentage of impact of each variable on the efficiency rating is then calculated using the following formula:

$$WI=100\times CI/TCI, \qquad (14)$$

where

WI=the weighted percentage of impact of the variable on the efficiency rating,

CI=the calculated impact of the variable calculated above, and

TCI=the sum of all of the calculated impacts of the variables calculated above.

The weighted percentage impact of handled calls in the example is 2.27/(2.27+1.82+1.36+0.91+0.45+1.36+1.82+1.82)=2.27/11.81=19.2%. The results from calculating each variable's weighted percentage impact on the efficiency ratio are shown in Table 10 below.

TABLE 10

| Variable | Deviations | % Impact | Calc. Impact | Wtd. % act |
|---|---|---|---|---|
| Handled calls | 5 | 22.7% | 2.27 | 19.2% |
| Abandoned calls | 2 | 9.1 | 1.82 | 15.4 |
| Line talk time | 3 | 13.6 | 1.36 | 11.5 |
| Line abandon time | 2 | 9.1 | 0.91 | 7.7 |
| Line abandon time | 1 | 4.5 | 045 | 3.8 |
| Agent talk time | 3 | 13.6 | 1.36 | 11.5 |
| Agent work time | 4 | 18.2 | 1.82 | 15.4 |
| Agent idle time | 2 | 9.1 | 1.82 | 15.4 |

Both the percentage impact and the weighted percentage impact figures indicate that handled calls had the greatest impact on the efficiency rating of the call traffic processing system of the example. While the management of the processing system cannot affect the number of calls available to the system for processing, the percentage and weighted percentage impact figures indicate that a greater number of calls should have been handled during the period, given the number of calls that were available for processing. That conclusion is reinforced by the relatively high figure for the abandoned calls weighted percentage impact. Noting that the figures for agent talk time and agent work time leads to the conclusion that greater than average time was spent on the average transaction during the period in question. Therefore, the efficiency rating of the system may be increased by encouraging the agents to handle transactions more expeditiously.

The example illustrates that the invention allows an organization's managers, in this case call center supervisors, to use their expertise to interact and direct the call center's functionality and efficiency in an active rather than passive manner. The invention allows immediate measurement and correction of the call center's performance.

A report including the comparisons of the efficiency rating for the current period with the ideal, average, and previous period's rating and the variable's percentage and weighted percentage impacts on the efficiency rating is prepared for use by the organization's management. As indicated above, the efficiency rating provides an organization's management measure of organization's overall performance, the comparisons of ratings indicate the trend of the organization's performance, and the impact figures provide a means to systematically modify the organization to improve its performance.

Although the present invention and its advantages have been described in detail, it should be understood that various changes, substitutions and alterations can be made herein without departing from the spirit and scope of the invention as defined by the appended claims.

What is claimed is:

1. A method, to be carried out on a computer having a memory and a processor, for generating a performance report on the efficiency of a call processing center, the method comprising the steps of:

defining a plurality of performance variables for the call processing center, said performance variables having a measurable property for the call processing center;

storing said performance variable definitions in the computer's memory;

collecting data for each of said performance variables for a period of time;

storing the time period's variable performance data in the computer's memory;

mapping, with the computer's processor, the data for each of said plurality of performance variables for the time period to a normalized performance variable having a neutral value and at least one inflection point within a normalized range of values, said inflection point describing varying effects of said normalized performance variable on the call processing center's efficiency;

storing said plurality of normalized performance variables in the computer's memory;

inputting into the computer's memory a weighting factor for each of said performance variables, said weighting factor relating to the importance of each of said performance variables to the efficiency of the call processing center;

retrieving said plurality of normalized performance variables and said variable weighting factors from the computer's memory to the computer's processor and calculating a plurality of weighted normalized performance variables;

storing said weighted normalized performance variables in the computer's memory;

calculating with the computer's processor the efficiency of the call processing center as a function of said plurality of weighted normalized performance variables; and providing the performance report from the computer showing the call processing center's calculated efficiency for the time period.

2. The method of claim 1, wherein said mapping step further comprises the step of mapping a variable within a performance range having at least one good value and at least one bad value.

3. The method of claim 1, wherein said mapping step further comprises the step of normalizing said plurality of performance variables for comparing uncommon raw data values among one another.

4. The method of claim 1, wherein said inputting weighting factors step further comprises the step of inputting said weighting to a value for providing an unweighted group weighting.

5. The method of claim 1, wherein said efficiency calculating step further comprises the step of calculating the efficiency of all groups within a call processing center.

6. The method of claim 1, wherein said efficiency calculating step further comprises the step of calculating the efficiency of a single group within a call processing center.

7. The method of claim 1, wherein said efficiency calculating step further comprises the step of calculating the efficiency of an individual portion of a group within a call processing center.

8. The method of claim 1, further comprising the step of transforming at least one external event into a performance variable for determining the external variable's effect on the call processing center's efficiency.

9. A method, to be carried out on a computer having a memory and a processor, for generating a performance report describing the interaction of a plurality of input variables relating to the efficiency of a call processing center, the method comprising the steps of:

defining a plurality of performance variables for the call processing center, said performance variables having a measurable property for the call processing center;

storing said performance variable descriptions in the computer's memory;

collecting data for each of said performance variables for a period of time;

mapping, with the computer's processor, the data for each of said plurality of performance variables to a normalized performance variable according to a neutral value and at least one inflection point of said performance variable within a normalized range of values, said inflection point describing varying effects of said normalized performance variable on the call processing center's efficiency;

inputting into the computer's memory a weighting factor for each of said normalized performance variables to produce a plurality of weighted normalized performance variables, said weighting factor relating to the importance of each of said normalized performance variables to the efficiency of the (organization) call processing center;

determining with said processor the interactions among said weighted normalized performance variables;

recording in said memory said interactions between the performance variables;

storing in said memory said interaction between said weighted normalized performance variables in an interaction table in said computer's memory, said interaction table comprising a plurality of values, each of said values for associating said weighted normalized performance variables among one another;

describing significant chants in a performance variable through a change function: and providing the performance report from the computer showing the interaction of the plurality of performance variables relating to the efficiency of the call processing center and significant changes in a performance variable for the time period.

10. The method of claim 9, wherein said interaction storing step further comprises the step of recording in said memory in a first interaction table an entry for each performance variable that reflects whether the performance variable is expected to increase or decrease when another variable increases and all other performance variables remain constant.

11. The method of claim 9, wherein said mapping step further comprises the step of normalizing said plurality of performance variables for comparing uncommon raw data values among one another.

12. The method of claim 9, further comprising the step of uniquely inputting into the computer the format and content of the interaction tables.

13. The method of claim 9, further comprising the step of automatically establishing with the computer's processor the format and content of the interaction tables.

14. The method of claim 9, wherein said storing an interaction table step further comprises the step of storing actually measured performance variables for indicating the actual performance of the call processing center.

15. The method of claim 9, further comprising the step of querying said interaction tables to determine at least one factor that would cause a predetermined performance variable to change.

16. The method of claim 9, further comprising the step of querying said interaction table to determine the effect of the call processing center of a change in a predetermined performance variable.

17. The method of claim 9, further comprising the step of outputting a list of possibly changing interactions as determined by a plurality of deviations from the interaction tables against a predetermined acting variable.

18. The method of claim 9, further comprising the step of producing a list of variables that were possibly influenced by forces outside of the model as determined by deviations from the interaction tables against the reacting variable.

19. A method for monitoring the efficiency of a call processing center with a digital computer having a memory and processor, the method comprising the steps of:

a. selecting a plurality of performance variables relating to the performance of the call processing center that together characterize the efficiency of the organization;

b. inputting into the computer's memory said performance variables;

c. selecting a plurality of time intervals during which to accumulate performance variable data;

d. inputting into said computer's memory at least one interaction table that contains an expected change in each performance variable when at least one other performance variable changes;

e. collecting performance variable data for a most recent one of the time intervals;

f. storing said variable data in said memory;

g. calculating with said processor a most recent efficiency rating for the most recent time interval using said performance variable data;

h. determining with said processor the relative impact of each performance variable on the efficiency rating for said most recent time interval; and i. based upon the results of step h modifying selected ones of said performance variables to increase the call processing center's efficiency.

20. The method of claim 19, further comprising a mapping step for mapping a variable within a performance range with said processor, said performance having at least one good value and at least one bad value.

21. The method of claim 20, wherein said mapping step further comprises the step of normalizing said plurality of performance variables for comparing uncommon raw data values among one another.

* * * * *